July 20, 1948.   S. RAMO   2,445,584
PULSE RECEIVING SYSTEM
Filed April 13, 1942   2 Sheets-Sheet 1
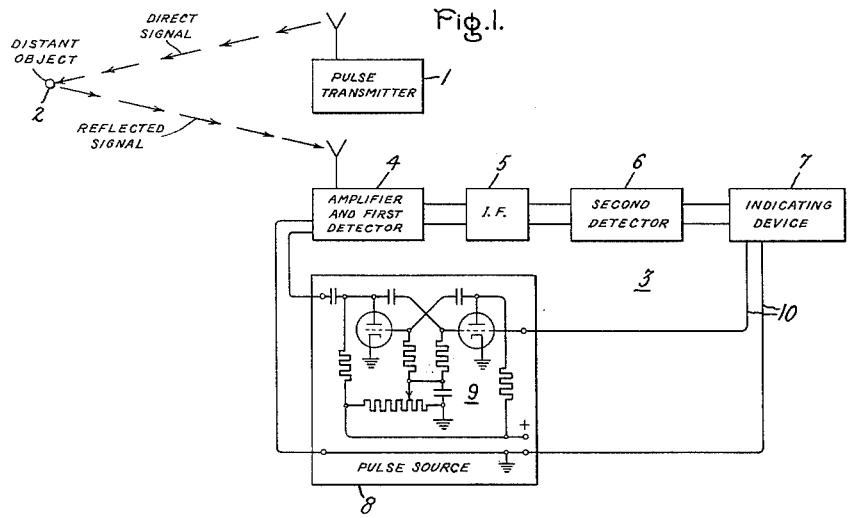
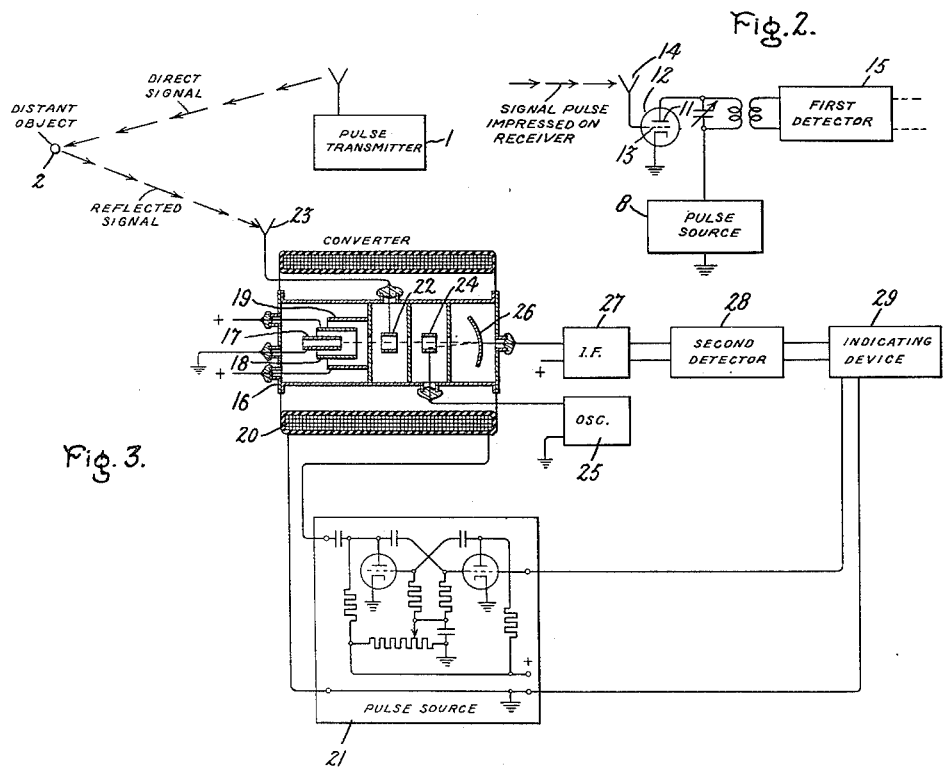
Inventor:
Simon Ramo,
by Harry E. Dunham
His Attorney.

July 20, 1948. S. RAMO 2,445,584
PULSE RECEIVING SYSTEM
Filed April 13, 1942 2 Sheets-Sheet 2

Inventor:
Simon Ramo,
by Harry E. Dunham
His Attorney.

Patented July 20, 1948

2,445,584

UNITED STATES PATENT OFFICE 2,445,584

PULSE RECEIVING SYSTEM

Simon Ramo, Schenectady, N. Y., assignor to General Electric Company, a corporation of New York Application April 13, 1942, Serial No. 438,699

6 Claims. (Cl. 343—5)

My invention relates to systems for receiving pulse signals and its general object is to provide an improved system such that substantially increased response to the signal pulses is obtained without increase in size and cost of the receiving apparatus and without danger of overloading of electron discharge devices of the apparatus.

It is a particular object to provide a system of this character for the receiving of a signal from a distant object by short-period microwave pulses radiated from the apparatus and received thereat after reflection from the distant point.

In accordance with the present invention these objects are attained by providing, for an electron discharge device or devices included in the receiver through which the signal pulses are translated, operating or energizing voltage in the form of a succession of relatively short-period and high-intensity pulses, the receiver being so arranged that from the apparatus which includes the discharge device or devices thus energized by high-intensity pulses a signal corresponding to and identifying the received pulse signal may be derived and impressed upon an indicating device.

Figure 4:
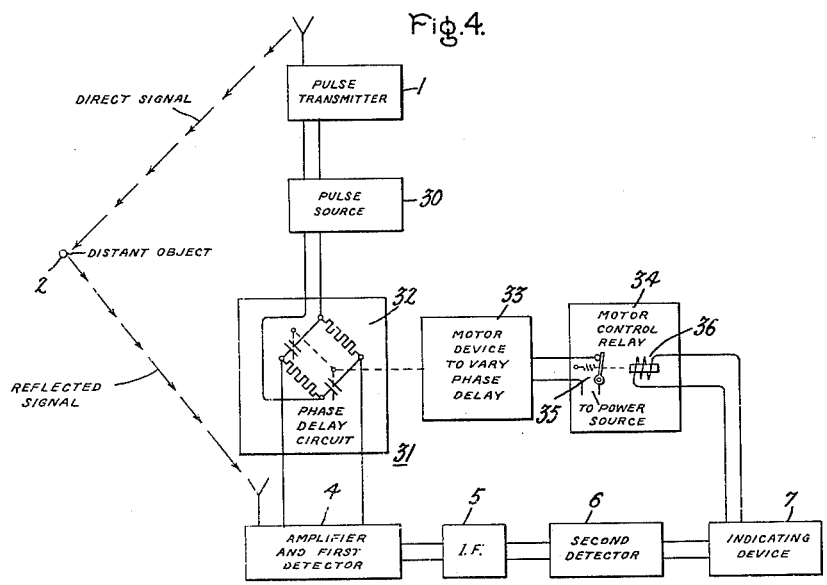
Figure 5:
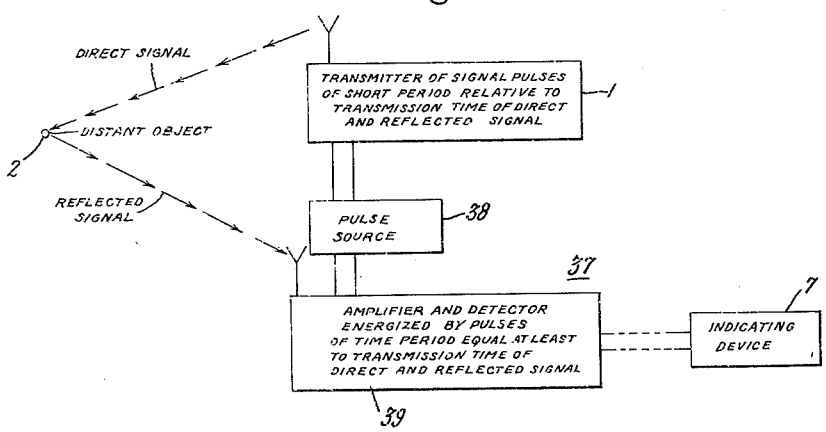

The novel features which are considered to be characteristic of my invention are set forth with particularity in the appended claims. My invention itself, however, both as to its organization and method of operation together with further objects and advantages thereof may best be understood by reference to the following description taken in connection with the accompanying drawings wherein Fig. 1 is a diagrammatic illustration of a pulse receiving and translating system in which my invention has been embodied; Fig. 2 illustrates in detail a portion of the receiving system; Fig. 3 illustrates a modification of the system shown in Fig. 1, employing an electron discharge device of the beam type; Fig. 4 illustrates a further modification of the system shown in Fig. 1, incorporating phase delay means between a transmitter and a receiver; and Fig. 5 illustrates a modification wherein the period of pulses of operating potential supplied to a receiver equals the total transmission time of the signal pulses.

Referring to Fig. 1, in the system shown therein as for the receiving of a signal from objects by reflected pulses but which may be employed for the receiving of other pulse signals, the numeral 1 indicates a transmitter of any suitable type adapted to project a succession of short-period high-intensity microwave pulses to a distant object 2 for reflection therefrom, and the numeral 3 indicates apparatus for receiving the signal.

The receiver 3 includes an amplifier and first detector stage 4 which may incorporate amplifier, converter and local oscillator electron discharge devices of any preferred form, an intermediate frequency stage 5, a second detector 6, and an indicating device 7. In accordance with the present invention a pulse source 8, shown here as a relaxation oscillator 9 of the multivibrator type but which may be any suitable device adapted to produce relatively short-period high-intensity pulses, is connected to the receiver 3 to provide pulses of anode or other operating voltage to a device or devices of the receiver. To maintain at a predetermined frequency the succession of pulses provided by the pulse source 8 the latter source is preferably interconnected, through leads 10, with the indicating device 7 or with the output of second detector stage 6. The pulses supplied from the source 8 are preferably of longer period than that of the signal pulses impressed upon the receiver.

As shown in detail in Fig. 2, the high-intensity pulses of operating potential from the pulse source 8 may be supplied to the anode 11 of an amplifier electron discharge device 12, upon the control electrode 13 of which signal pulses are impressed from the antenna 14 and the output of which is impressed upon a first detector 15 which may be followed by suitable further stages (not shown in Fig. 2), as in Fig. 1.

The pulse source 8 is shown in Fig. 2 as arranged to supply operating potential to a single electron discharge device, as amplifier 12. It will be understood, however, that any other electron discharge devices of the receiver may be likewise supplied with pulses of operating potential.

In operation of the pulse signal receiving apparatus of Figs. 1 and 2 the succession of microwave high-intensity pulses the period of which may be of the order of a microsecond, for example, recurring at a predetermined frequency, may be projected from the transmitter 1 to the distant object 2 and received after reflection from the object. The multivibrator 9 is so adjusted that its pulsing frequency is initially near but not necessarily identical with that of the received signal pulse frequency. The slight difference in frequency of the received signal pulses and the pulses of operating potential causes the pulses from the two different sources to occur together eventually. Only at this instant of simultaneous occurrence of the two trains of pulses does the receiver become operative.

When operation of the receiver is thus initiated an intermediate frequency from the first detector is then impressed through stage 5 upon the second detector 6 and the output of the latter detector, containing a suitable signal corresponding to the received signal pulses is impressed upon the indicating device 7. The output of the second detector 6 is preferably utilized to "lock in" the multivibrator 9 or to maintain the frequency of the pulses therefrom at their predetermined operating value by impressing a suitable synchronizing voltage upon the multivibrator through the leads 10.

From the foregoing description of the system in accordance with my invention for receiving and translating any signal pulses which may be impressed upon the receiver, for example for receiving a signal from distant objects by means of reflected short-period pulses as shown for illustrative purposes in Fig. 1, it will be apparent that by causing a receiver of the signal pulses to become operative during a succession of relatively short-period and widely spaced periods corresponding, for example, to the instants of arrival of the signal pulses and by supplying operating potential to an electron discharge device or devices of the receiver during these short periods only, by a succession of extremely high intensity pulses, the response of a receiving apparatus for this purpose, employing construction elements of usual dimensions and arrangement, to the received signal pulses may be increased many-fold as compared with the normal response of such receiving apparatus. Of course it is necessary that the pulses of operating potential be spaced apart sufficiently in time to permit dissipation of heat generated within the devices to avoid impairment thereof by the high operating voltage.

As an example of a practical system such as described above in connection with Figs. 1 and 2, a type No. 954 electron discharge device may be utilized as the amplifier designated by the numeral 12. The normal anode voltage of the device of this type is of the order of 100 volts. When employed in the above-mentioned system, however, the voltage of the pulses of operating potential is of the order of 500 volts with a resulting substantial increase over the normal response of the apparatus to the received signal pulses.

Referring to Fig. 3, the various elements of the modification shown therein are essentially similar to those of the system described in connection with Fig. 1 except that in Fig. 3 the receiver is shown as comprising an electron discharge device 16 of the beam type employed as a converter. The device 16 is illustrated as a usual velocity modulation tube but any suitable converter device may be employed. The device 16 includes an electron source, as cathode 17, and elements 18 and 19 associated therewith to provide electrons for the electron beam. A magnetic focusing field to produce the electron beam is provided by a winding 20 surrounding the tube and connected to a source 21 of relatively short-period and high-intensity pulses. The latter source may be essentially the same as source 8 of Fig. 1. The electron beam is passed through a cylindrical electrode 22 connected to an antenna 23 for receiving signal pulses, for example the pulses reflected from the distant object 2, and through a second cylindrical electrode 24 connected to a local oscillator 25, to impinge upon a reflector 26 at the opposite end of the tube. The output of the velocity modulation converter 16 is impressed upon an intermediate frequency stage 27 and the output of a second detector 28 connected thereto is impressed upon an indicating device 29 and also utilized as in Fig. 1 to "lock in" the pulse source, 21, at its predetermined frequency.

When signal pulses impressed on electrode 22, as from antenna 23, and pulses of operating potential, of somewhat longer period than that of the signal pulses and supplied to the focusing winding 20 from source 21, occur simultaneously, the receiver becomes operative. The electron beam, recurring at the predetermined frequency, is velocity modulated by the signal pulses impressed upon electrode 22. The beam is further velocity modulated by the local oscillator 25 and a signal corresponding to the received pulse signal, derived from the converter 16 and translated through the intermediate frequency stage 27 and the second detector stage 28, is impressed upon the signal indicating device 29.

In Fig. 3 while a converter device only is shown as supplied with pulses of operating potential, it is to be understood that other electron discharge devices of the apparatus may be similarly supplied.

By employing the high intensity pulsing of a velocity modulation discharge device or devices in the pulse receiving system as above described, much more than the normal conductance of such devices is provided during the period of the pulses of operating potential. It is known that velocity modulation discharge devices, which in theory offer means for amplifying and converting signals in the ultra high frequency range, are characterized by low conductances. One limitation is a difficulty in obtaining an electron beam of sufficiently high current. In accordance with my present invention this difficulty is overcome to a substantial degree by utilizing, as illustrated in Fig. 3 a pulsed magnetic field of unusually high strength which may be caused to persist for a period somewhat longer than the duration of the signal pulse to be received and translated, and which, during that time, makes possible the focusing of an abnormally large beam current.

In a practical system such as shown in Fig. 3 an electron discharge device may be used of the beam type such as described in an article entitled "Velocity modulated tubes," in the Proceedings of the I. R. E. of February 1939, vol. 27, number 2, pages 106–116. In this device the normal voltage applied to a winding which produces the focusing field for the electron beam is of the order of 200 volts. In the system in accordance with my present invention, however, the voltage of the pulses of operating potential applied to the winding 20 of Fig. 3 is of the order of 1000 volts with a resulting large increase in the receiver response to the translated signals corresponding to the increase in electron beam current at each pulse period.

In the modification illustrated in Fig. 4, a pulse transmitter 1 may be provided as in Figs. 1 and 3 to radiate microwave high-intensity pulses to a distant object 2 which reflects the pulses to the receiver, in which is translated, through intermediate amplifier and second detector stages 5 and 6, a signal which is impressed upon an indicating device 7. Pulses of operating potential are supplied to an electron discharge device or devices of the receiver in a manner to be presently explained.

In the system of Fig. 4, instead of synchronizing, with the frequency of the signal pulses, the frequency of the pulses of operating potential supplied to the receiver by locking in a second pulse source after the receiver becomes operative, a single pulse source 30 is employed operatively associated with the microwave pulse transmitter 1 and with the receiver. The pulse frequencies for the transmitter and receiver respectively are therefore the same. However, because of the time required for the transmission of the signal from transmitter 1 to the object 2 and back to the receiver, the signal pulses impressed upon the receiver are out of phase with the pulses of operating potential supplied thereto unless corrective measures are taken.

In accordance with the present invention to synchronize the signal pulses and the pulses of operating potential supplied to the receiver, a phase delay arrangement 31 is interposed between the pulse source 30 and the receiver which may include any usual phase delay circuit such as the resistance-capacity bridge circuit 32, a suitable motor device 33 to vary the phase delay produced by circuit 32, and a means such as a relay 34 to control the motor device including normally closed contacts 35 connecting the motor device to a power source, and an actuating winding 36 to open the contacts 35 and adapted to be energized from the indicating device 7 or from the output of the second detector 6.

Let it be assumed that the signal pulses and the pulses of operating potential are being supplied to the receiver and at the same time the phase delay is being continuously varied at the circuit 32. Then at the instant that the phase delay becomes proper for compensating for the time delay of the pulse signal corresponding to the transmission time of the latter signal, the receiver becomes operative, and the relay 34 is at once actuated from the output of second detector 6 to stop the motor device 33, thereby to maintain the adjustment of the phase delay circuit 32 at the proper point.

Any other suitable means than as shown and described herein in connection with Fig. 4 for causing proper phasing of the pulses of operating potential with the signal pulses and for maintaining the phasing during any given transmission time of the signal pulses may be employed.

In the modification illustrated in Fig. 5, the transmitter 1 radiates, as in the other systems hereinabove described, a succession of microwave pulses the period of which, of the order of a microsecond for example, is very short relative to the total transmission time of the signal in its travel from transmitter 1 to distant object 2 and back to the receiver, designated by the numeral 37. However, instead of pulsing the transmitter and the receiver from different sources and synchronizing the two pulse trains as in Figs. 1 and 3, or pulsing both transmitter and receiver from the same source, and delaying the phase of the receiver pulse to compensate for the transmitter signal transmission time, as in the system of Fig. 4, in the system of Fig. 5 the receiver is pulsed at the same instant that the transmitter pulse goes out. This may be accomplished in any suitable manner, for example by providing a single pulse source 38 for the transmitter and receiver but without phase delay such as employed for example in the system of Fig. 4.

To insure that the signal pulse will be received and translated at each cycle the receiver is so arranged by the employment of any usual or preferred means (not shown) for the purpose, that the duration of the pulse of operating potential applied at each cycle to the receiver is at least equal to the total time of transmission of the signal pulse from transmitter to distant object and back to the receiver.

For the receiving of a pulse signal from an object, for example, within a distance of 100 miles from the system of Fig. 5, the total elapsed time between the arrival of the pulse of operating potential and the signal pulse cannot exceed approximately 1000 microseconds.. Assuming that the transmitter pulses are sent out at the rate of one every sixtieth of a second, then if the receiver is pulsed directly at the instant the transmitter pulse starts, the receiver pulse, having, however, a duration of 1000 microseconds, it follows that the signal pulse is sure to arrive at the receiver during the operating voltage pulse duration and to be translated through the receiver at each cycle. By suitable usual and well known means an indication corresponding to the received signal pulses may be derived from the stage 39 and impressed upon an indicating device 7.

In the foregoing example of a practical pulse receiving system such as illustrated in Fig. 5, by the employment of the pulsing method shown therein a raising of energizing voltages in the receiver is permitted during the operating potential pulse period by such a ratio as to give a tube dissipation advantage of 1000/60, or 16 times. Substantial improvement in receiver performance is thereby obtained and no synchronizing circuits of any kind are required to produce this result.

My invention has been described herein in particular embodiments for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States is:

1. In a system for detecting a distant object, a pulse source, a transmitter connected to said source to project a succession of signal pulses at a predetermined frequency to said object, a receiver adapted to have said signal pulses impressed thereon after reflection from said object, means including said pulse source to apply to said receiver a succession of high intensity pulses of operating potential at said predetermined frequency, means interposed between said source and said receiver to shift the phase of said pulses of operating potential, an indicating device, means to impress a signal derived from said receiver upon said indicating device when said pulses of operating potential become in phase with said pulses impressed upon said receiver and means responsive to said signal to render said phase shifting means inoperative.

2. In a system for detecting a distant object comprising a transmitter to project a succession of signal pulses at a predetermined frequency to said object, a receiver adapted to have said signal pulses impressed thereon after reflection from said object, means to apply to said receiver a succession of high intensity pulses of operating potential at said predetermined frequency, a phase delay device interposed between said means and said receiver, means to actuate said phase delay device over a range of phase delay positions, an indicating device, means to impress a signal derived from said receiver upon said indicating device when said pulses of operating potential become in phase with said pulses impressed upon said receiver, and means responsive to said signal to stop said phase delay actuating means.

3. In a radio echo system, a transmitter, a receiver including an electron discharge device, means to supply to said transmitter pulses to be radiated and to supply to said discharge device pulses of operating potential, said operating potential having intensity greater than any continuous potential which said discharge device is designed to withstand, and the intervals between said pulses of operating potential being sufficiently great to prevent injury to said discharge device from overheating due to said potential, means to synchronize said pulses of operating potential with pulses to be received resulting from said transmitted pulses, and an adjustable phase shifting means connected between said pulse supplying means and said discharge device to phase said pulses of operating potential to agree in phase with said received pulses.

4. In a receiver for periodic pulses received from a remote point, an electron discharge translator for said pulses having output dependent in intensity on the operating potential applied thereto, means to supply periodic pulses of operating voltage to said translator, said pulses having intensity in excess of any voltage which said translator is designed to withstand thereby to increase the output from said translator, and the intervals between said pulses being sufficiently great to prevent injury to said discharge device from current produced therein by said large voltage, means responsive to said received pulses to synchronize said pulses of operating voltage with said received pulses, means to supply said received pulses to said translator to control the intensity of said current, and signal means responsive to said intensity.

5. The combination, in a pulse range system in which recurrent pulses are transmitted to a distant object and resultant pulses are received from said object at a time later dependent upon the distance to said object, a receiver for said received pulses including an electron discharge device arranged to translate said received pulses, said device having output of magnitude dependent upon the operating potential applied thereto, means to increase the sensitivity of said receiver to said received pulses, said means comprising means to supply operating potential to said electron discharge device in pulses having the frequency of said recurrent pulses and having intensity sufficiently great materially to reduce the life of said device if applied continuously, said pulses being spaced apart in time sufficiently to prevent such reduction in life of said device, and means controlled by the received pulses to synchronize said pulses of operating potential with the received pulses in time whereby said received pulses are translated by said discharge device during the periods of said operating potential pulses.

6. The combination, in a receiver for periodic radio pulses received from a distant point, of means to increase the sensitivity of said receiver to said periodic pulses, said means comprising an electron discharge device in said receiver to translate the received pulses, said discharge device having output increasing in accord with the operating potential applied thereto, a local source of periodic pulse operating voltage, the pulses of said source having a frequency substantially equal to the frequency of said periodic pulses to be received and having intensity greater than the continuous operating voltage said device is designed to withstand, means to apply said periodic operating voltage to said device, said pulses being spaced apart in time sufficiently to prevent injury to said device and means responsive to received pulses translated by said device to maintain the pulses produced by said local source in time coincident with said received pulses.

SIMON RAMO.

REFERENCES CITED

The following references are of record in the file of this patent:

UNITED STATES PATENTS

| Number | Name | Date |
|---|---|---|
| 1,585,591 | Lowy | May 18, 1926 |
| 1,804,526 | Coxhead | May 12, 1931 |
| 1,924,174 | Wolf | Aug. 29, 1933 |
| 2,037,799 | Koch | Apr. 21, 1936 |
| 2,055,883 | Terry | Sept. 29, 1936 |
| 2,061,734 | Kell | Nov. 24, 1936 |
| 2,078,644 | Swedlund | Apr. 27, 1937 |
| 2,295,585 | Lindquist | Sept. 15, 1942 |
| 2,361,437 | Trevor | Oct. 31, 1944 |

FOREIGN PATENTS

| Number | Country | Date |
|---|---|---|
| 460,488 | Great Britain | Jan. 28, 1937 |